(12) United States Patent
Van Manen et al.

(10) Patent No.: US 7,715,985 B2
(45) Date of Patent: May 11, 2010

(54) METHOD OF EVALUATING THE INTERACTION BETWEEN A WAVEFIELD AND A SOLID BODY

(75) Inventors: Dirk-Jan Van Manen, Redhill (GB); Johan Robertsson, Oslo (NO); Andrew Curtis, Edinburth (GB)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 11/690,492

(22) Filed: Mar. 23, 2007

(65) Prior Publication Data
US 2007/0233437 A1    Oct. 4, 2007

(30) Foreign Application Priority Data
Mar. 28, 2006    (GB) ................. 0606132.9

(51) Int. Cl.
*G01V 1/00* (2006.01)
*G06G 7/56* (2006.01)

(52) U.S. Cl. ................. 702/14; 703/5; 367/73

(58) Field of Classification Search ........... 702/14, 702/1–2, 16–17, 5, 8, 11–13, 81, 189–191; 367/72–73, 14, 15, 21, 37, 38, 40, 43, 45, 367/56, 58; 703/1–2, 5
See application file for complete search history.

(56) References Cited

U.S. PATENT DOCUMENTS

| | | | | |
|---|---|---|---|---|
| 5,394,325 A | * | 2/1995 | Schneider, Jr. ............... | 702/18 |
| 5,757,723 A | * | 5/1998 | Weglein et al. ............... | 367/38 |
| 6,125,330 A | | 9/2000 | Robertson et al. ............. | 702/14 |
| 6,643,590 B2 | * | 11/2003 | Wiggins ....................... | 702/16 |
| 6,950,790 B1 | * | 9/2005 | Nichols ....................... | 703/10 |

FOREIGN PATENT DOCUMENTS

WO    WO 2006/040521    4/2006

OTHER PUBLICATIONS

Robertsson et al., An Efficient Method for Calculating Finite-Difference Seismograms After Model Alterations, May-Jun. 2000, Geophysics, vol. 65, No. 3, pp. 907-918.*
Alterman and Karal, "Propagation of elastic waves in layered media by finite-difference methods," *Bulletin of the Seismological Society of America*, 58:367-398, 1968.
Givoli and Cohen, "Nonreflecting boundary conditions based on Kirchhoff-type formulae," *J. Comp. Phys.*, 117:102-113, 1995.
Kelly et al., "Synthetic seismograms: a finite-difference approach," *Geophys.*, 41:2-27, 1976.
Moczo et al., "The finite-difference time-domain method for modeling of seismic wave propagation," *Advances in Geophysics*, 48:421-516, 2007.

(Continued)

*Primary Examiner*—Michael P. Nghiem
*Assistant Examiner*—Toan M Le
(74) *Attorney, Agent, or Firm*—WesternGeco L.L.C.

(57) ABSTRACT

Described is a finite-difference methodology for efficiently computing the response from a model subject to changes within sub-volumes with the sub-volume enclosed with an extrapolation surface within an injection boundary using Green's functions to update the injection boundary and transmitting an updated wavefield from the injection boundary back into the altered sub-volume to include higher order reflections from outside of the altered sub-space.

20 Claims, 2 Drawing Sheets

OTHER PUBLICATIONS

Robertsson and Chapman, "An efficient method for calculating finite-difference seismograms after model alterations," *Geophys.*, 65:907-918, 2000.

Robertsson et al., "Viscoelastic finite-difference modeling," *Geophys.*, 59:-1444-1456, 1994.

Teng, "Exact boundary condition for time-dependent wave equation based on boundary integral," *J. Comp. Phys.*, 190:398-418, 2003.

Ting and Miksis, "Exact boundary conditions for scattering problems," *J. Acoust. Soc. Am.*, 80:1825-1827, 1986.

van Manen, Robertsson and Curtis, "Modeling of wave propagation in inhomogeneous media," *Phys. Rev. Lett.*, 94:164301, 2005.

* cited by examiner

METHOD OF EVALUATING THE INTERACTION BETWEEN A WAVEFIELD AND A SOLID BODY

The present invention relates to methods of determining the response caused by alterations of a model in simulations of wave propagation. More specifically, it relates to determining the seismic response caused by model alterations in finite-difference (FD) simulations.

BACKGROUND OF THE INVENTION

A wide variety of modeling, processing and inversion algorithms require the recalculation of the response after local alterations to an initial model. For example, pre-stack finite-difference migration of seismic data provides a highly accurate means of producing images of the Earth's interior. The migration algorithm consists of recalculating the finite-difference response of small local changes to the seismic model. However, full finite-difference migration is rarely performed because of computational limitations restricting migration algorithms to the use of less accurate asymptotic techniques. Another example relates to finite-difference inversion, where recalculating the finite-difference response is the core (forward modeling step) of the algorithms.

Yet another example which is considered as being an important area of the present invention refers to so-called time-lapse seismics (or 4-D seismics). In this application it is of interest to investigate the effects that small (local) changes to the model have on the seismic response, e.g., varying water-oil-contact levels in a producing reservoir.

Also, in forward modeling, it may be of interest to re-compute the response of an altered seismic model. Forward modeling may serve as a means of learning what effects certain features of a seismic model have on the full response. Also, as the knowledge of the model evolves, or as it becomes more refined, a simulated response may need to be updated.

Another area of interest regarding the present invention lies in Amplitude Variation with Offset (AVO) calculations, where the effects of, for instance, changes of the degree of anisotropy of a cap-rock may be the target of investigation.

Furthermore, FD modeling has been used in connection with borehole measurements, simulations of tool behavior and characteristics in their operational environment. Typically, it is of interest to investigate the effects that small changes to the tool design or model parameters have on the propagation of waves in the vicinity of the tool.

The common feature of these problems is that changes to the model are often restricted to a small sub-volume, but finite-difference simulations are required for the full model with several alterations. A method that would allow full finite-difference simulations for the complete model to be corrected for these changes while only requiring calculations in the sub-volume and its neighborhood could significantly reduce the computational cost both in terms of the number of calculations and memory for storage of material parameters and variable fields.

Finite-difference methods provide an accurate way of computing seismograms from complex seismic models. However, as mentioned above, the finite-difference simulations tend to become prohibitively expensive to run on even state-of-the-art computing equipment. Therefore, different approaches have been taken to make highly accurate numerical modeling methods such as finite-difference schemes more efficient. Two major directions of effort to achieve significant computational savings can be found in the literature: (1) hybrid techniques; and (2) grid-refinement techniques.

In the U.S. Pat. No. 6,125,330, in the background art as cited therein, and in: Robertsson and Chapman, Geophysics Vol. 65, No. 3 (May-June 2000), p. 907-918, there are described methods of injecting an analytical source solution recorded during an initial simulation on a full model on a surface surrounding a smaller domain, to drive a finite-difference computation on the smaller domain. In the proposed FD-injection approach the injection surface is transparent for waves scattered by the perturbations, allowing them to "leak trough" the injection surface and to be extrapolated to a set of receivers. However, even as an improvement over other known methods, the proposed method places still high demands on the performance of absorbing boundary conditions and significantly increases the size of computational domain (and thus the computational cost).

Exact non-reflecting boundary conditions have been proposed in: Ting and Miksis, J. Acoust. Soc. Am. 80, 1825 (1986) for scattering problems based on the Kirchhoff integral. These methods use extrapolating the wavefield from an artificial surface surrounding the scatterer to the boundary of the computational domain, the exact boundary conditions are found, necessary to truncate the computational domain without generating spurious reflections. The known scheme has several advantages in that it is explicit, it only requires past values on the extrapolation surface and if an explicit difference scheme is used in the interior, the boundary condition can be solved at each time step independently. The extrapolation surface can be of arbitrary shape or size, the size of the computational domain can be of the same order as the scatterer. However the method as proposed by Ting and Miksis and as tested by others makes use of free-space Green's functions thus assuming or enforcing a homogenous background medium where the values of the extrapolated wavefield on the boundary depend only the values of the wavefield on the extrapolation surface at the retarded times $t-r/c$, where $r/c$ is the traveltime of the wavefield between the extrapolation surface and the boundary.

The boundary is non-reflecting. The process neglects scattering due to an inhomogeneous medium outside the volume enclosed by the extrapolation boundary.

In Phys. Rev. Lett. 94, 164301 (2005) and in the co-owned international patent application PCT/GB2005/003852, entitled "Processing Data representing Energy propagating through a Medium" and filed on 6 Oct. 2005, the inventors of the present invention described methods using the representation theorem for the wave-equation in combination with time-reversal invariance and reciprocity, to express the Green's function between two points in the interior of the model as an integral over the response in those points due to sources regularly distributed on a surface surrounding the medium and the points. In the application reference is made to the above-cited U.S. Pat. No. 6,125,330 and it is proposed to combine the method of FD-injection of the latter with the efficient calculation of Green's calculation of the former.

In view of the above cited prior art it is an object of the invention to provide methods for improving the efficiency of seismic wave-field calculation as described in U.S. Pat. No. 6,125,330. It is a more specific object of the invention to improve the effectiveness of boundary conditions around sub-parts or domains in a larger finite-difference model.

SUMMARY OF THE INVENTION

The objects of the invention are achieved by methods and apparatus as set forth in the appended independent claims.

According to aspect of the invention, a method is described of evaluating the interaction between a wavefield and a solid body, the method including the steps of using a model including physical and/or geometrical properties representing the body; generating at locations within said model initial waveforms representing an initial interaction between the wavefield and the body, having one or more extrapolation surfaces each enclosing a subspace of the model; and using Green's function to extrapolate a wavefield from the one or more extrapolation surfaces to a boundary. The method further includes the steps of changing at least a subset of the physical and/or geometrical properties in the subspace within the model; letting the wavefield propagate from the boundary into the interior of the subspace to generate changed waveforms representative of the interaction of the wavefield with the changed subspace; and evaluating the changed waveforms to determine the effect of the changes of the subset of the physical and/or geometrical properties in a subspace on the wavefield.

The novel method uses a boundary to which the wavefield is extrapolated as an injection boundary to inject a wavefield into an altered subspace within a bigger model.

The wavefield can be an acoustic or elasto-dynamic wavefield such as seismic or sonic wavefield usually comprising pressure and/or shear waves. The method can also be applied to other wavefields the propagation of which is determined by a form of wave equation. Examples of such other wavefields are optical or electromagnetic wavefields as governed by Maxwell's equations.

The model can be any form of numerical representation of a one-, two-, three- or multidimensional shape or body, such as lines, surfaces, contours, or representation of objects of the physical world. A model can be defined a including a coordinate space or grid and geometrical or physical parameters associated with points or volumes inside the coordinate space or grid. A model further includes constraints and boundary conditions which represent limitations or conditions set for the propagation of the wavefield. The preferred model of the present invention is a finite-difference (FD) model. In this model the wavefield is usually propagated by FD operators between points on a grid using a finite-difference form of the governing wave equation.

For the purpose of the present invention, FD operators include pseudo-spectral methods, finite-element methods (FEM), wavelet based methods, or other methods based on spatial discretization of the model. The calculated response is stored generally in form of a time series or vector for a set of grid points.

For a model representing a volume of earth in a seismic experiment, the geometrical or physical parameters can be locations of layer boundaries, faults or fractures, densities, wave velocities, stresses, elastic stiffness and others. Impedance, resistivity or related parameter may be considered in general. In general, any parameter appearing in the governing wave equation may have an equivalent representation in the model.

Green's functions are well known in the art as a method of solving differential equation. They are generally characterized as representing the response of a medium to an impulse input.

The new method includes the step of introducing a boundary from which a wavefield can be generated that propagates back into the space surrounded by the boundary. For that reason the boundary is also referred to as injection boundary. This property of the boundary is equivalent to being transparent to an incoming wavefield. In prior methods the boundary conditions for similar boundaries, i.e. boundaries updated using extrapolation by Green's functions, were usually set to absorbing the wavefield.

The Green's function used to update the injection boundary are preferably Green's functions calculated for the full model including the background and any inhomogeneity within the background. The background is the part of the model which is not updated when changes are introduced in one or more subspaces. However, it should be noted that in a model representing a real body this background generally includes inhomogeneities or scattering sites.

The present invention uses hence Green's function which include contribution of the wavefield scattered or reflected in the background but propagating back into an altered subspace. In scattering theories these part of the wavefield is usually referred to as second (or higher) order effects or multiples. It is seen as a particular advantage of the present invention that in the re-calculation of the wavefield in an altered model, higher-order scattering or multiples caused be the background are included. The preferred method of calculating Green's functions is the method described as interferometric in the above cited Phys. Rev. Lett. 94, 164301 (2005) and in the co-owned international patent application PCT/GB2005/003852.

When calculating an updated wavefield on the boundary, it is therefore not sufficient to restrict the methods to consider only the contribution of the wavefield on the extrapolation boundary as determined by the traveltime or by using (free-space) Green's function evaluated only at retarded values.

Instead, according to an aspect of the invention, the Green's function used extrapolate the contribution of the current wavefield from a point on the extrapolation surface to all future times or time steps at points on the boundary.

In a preferred embodiment the injection boundary is fully located inside the model space and thus does not form part of the boundary of the model space or the computational domain. It is seen as particular advantageous to place the injection boundary close to the extrapolation surface such that both, the extrapolation surface and the boundary enclose the updated sub-space.

According to another aspect of the invention, the model may include more than one subspace to be updated between model runs. Depending on the location and size of the subspaces, a single injection boundary can enclose more than one subspace. Alternatively each subspace may be enclosed by a corresponding injection boundary and Green's functions are used to propagate the wavefield from the extrapolation surface of one subspace to the injection boundaries enclosing the other subspaces. This approach can be computationally more efficient than enclosing a large volume of the model in a single injection boundary.

The Green's functions can also be used to extrapolate the wavefield between two arbitrary points in the full model domain. Preferably, Greens' functions are used to extrapolate a source signal or wavefield from a source location to an injection boundary or from an extrapolation surface to a receiver location.

These and other features of the invention, preferred embodiments and variants thereof, and further advantages of the invention will become appreciated and understood by those skilled in the art from the detailed description and drawings following below.

MODE(S) FOR CARRYING OUT THE INVENTION

Figure 1:
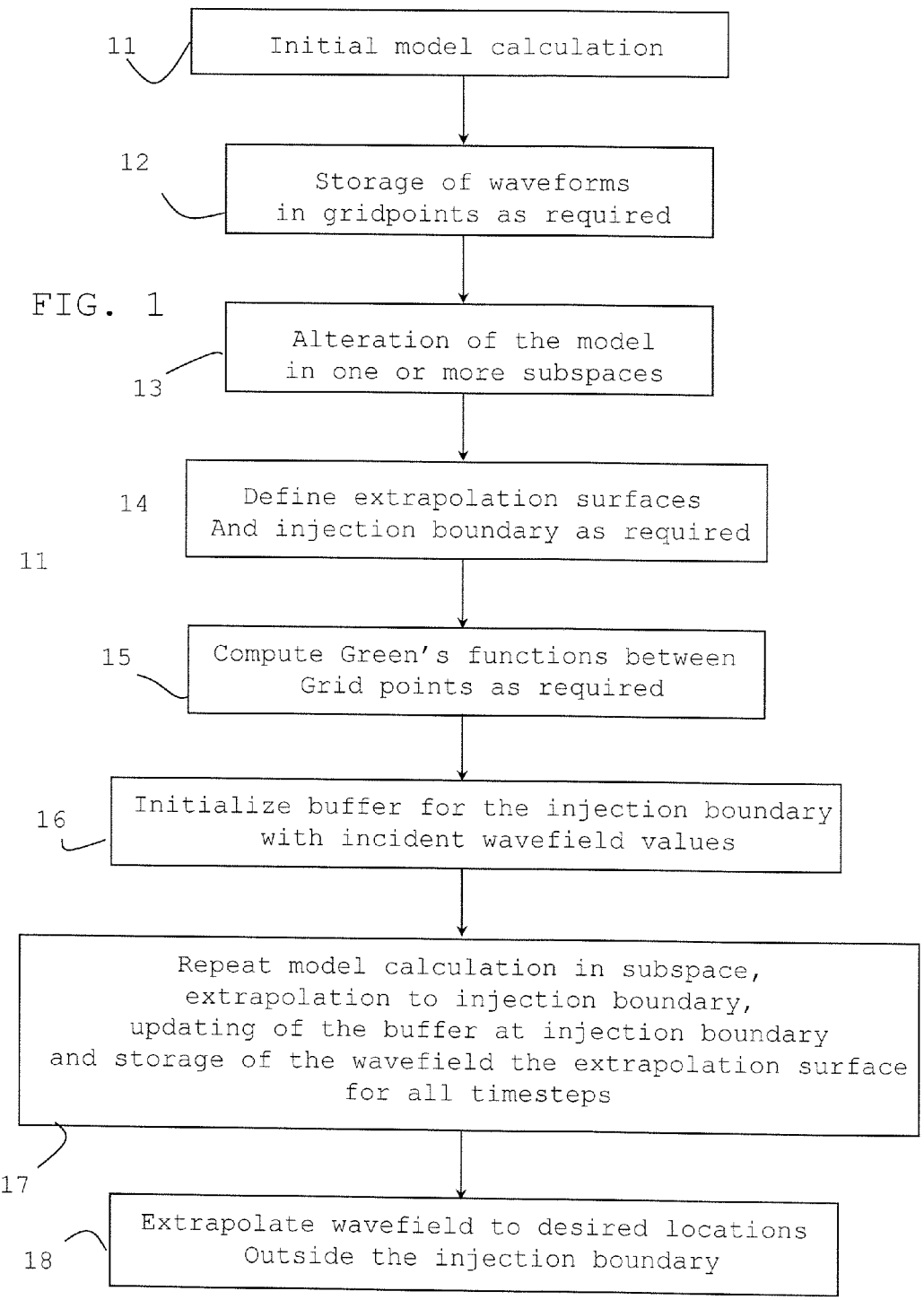
FIG. 1 shows a flow chart summarizing important steps of a finite-difference calculation in accordance with the invention.

From general scattering theory, it is known that a representation for the scattered pressure at any point, $x^R$, (x being a spatial vector) outside a surface $D_{sct}$ surrounding the scatterer, can be derived from the values of the waveform on the surface using:

$$p^{sct}(x^R, t) = \int_0^\tau \int_{\P D_{sct}} \left[ \begin{array}{l} G^q(x^R|x, \tau-t) v_k^{sct}(x, t) + \\ \Gamma_k^q(x^R|x, \tau-t) p^{sct}(x, t) \end{array} \right] v_k dA\, dt \qquad [1]$$

In eq. [1] the scattered wavefield $\{p^{sct}, v_k^{sct}\}$ is defined as the difference between the total wavefield $\{p, v_k\}$, propagating in the perturbed model, and the incident wavefield $\{p^{inc}, v_k^{inc}\}$, propagating in the background model and noting that both the incident and total wavefield are source free inside $D_{sct}$. The terms $G^q(x^R|x,\tau-t)$ and $\Gamma_k^q(x^R|x,\tau-t)$ are the Green's function for pressure due to point sources of volume injection and body force, respectively, in the background medium.

Equation [1] can also be used to extrapolate the total wavefield because the incident wavefield is source free in the region of the perturbation (the integral in the r.h.s. vanishes when the scattered wavefield quantities are replaced by incident wavefield quantities). Thus, the scattered wavefield at $x^R$ and time $\tau$ is caused by weighted contributions of the total wavefields on the surface at previous times t<τ. Any surface which surrounds the scatter or scatters or any surfaces which surrounds the scatter or scatters, but being fully within the boundaries of the computing domain for the full model, is in the following identified as extrapolation surface or surfaces S.

If the medium is not homogeneous outside the extrapolation surface and the scatterer occupies just a small part of the background model, eq. [1] may still be used to extrapolate the wavefield to any point outside the extrapolation surface. However, the exact, full waveform Green's functions for the inhomogeneous background model should be used instead of free-space Green's functions and boundary values can no longer be updated by evaluating eq. [1] only at the retarded values: the wavefield on the extrapolation surface S at time t may affect the wavefield at the boundary at all later times and the extrapolated wavefield at the boundary B contains both ingoing and outgoing waves (due to all multiple scattering between the two domains in the background model). Instead, rather than considering eq. [1] as giving the scattered pressure at time t as a function of the total wavefields at t<τ, it is more useful to write it recursively. After discretising the convolution integral this gives:

$$\hat{p}^{sct}(x^R, 1, n) = \qquad [2]$$
$$\hat{p}^{sct}(x^R, 1, n-1) + \int_{\P D_{sct}} \left[ \begin{array}{l} \hat{G}^q(x^R|x, 1-n) \hat{v}_k^{sct}(x, n) + \\ \hat{\Gamma}_k^q(x^R|x, 1-n) \hat{p}_k^{sct}(x, n) \end{array} \right] v_k dA$$

where the circumflex is used to differentiate between continuous time and sampled quantities. The equation shows that to update the scattered wavefield $p^{sct}(x^R,l,n-1)$ at $x^R$ at timestep n of the computation for all future time steps l, the Green's functions terms $G^q(x^R|x,\tau-t)$ and $\Gamma_k^q(x^R|x,\tau-t)$ can be scaled by the current value of the normal component of particle velocity $\hat{v}_k(x, n)\, \hat{v}_k$ and the pressure $\hat{p}(x, n)$ on the extrapolation surface and then added to the buffer of current and future boundary values.

Equation [4] is complemented by the incident wavefield $\hat{p}^{inc}(x^R, n)$ to give the total wavefield at $x^R$. The resulting boundary condition is exact and equivalent to the Neumann series solution to the scattering problem in that it includes all orders of interactions between the background model and the perturbations. It does not depend on the model or the choice of the extrapolation and boundary surface, as long as the extrapolation surface S completely surrounds the perturbations and the medium between the surface S and the boundary B is identical to the background model.

The full waveform Green's functions required for extrapolation to update the boundary condition, the incident wavefield and extrapolation back to a set of receivers may be computed efficiently and flexibly using for example the interferometric modeling method as described in Phys. Rev. Lett. 94, 164301 (2005) and in the co-owned international patent application PCT/GB2005/003852. In this approach, after systematically illuminating the background model from the outside using conventional forward modeling runs, while storing the wavefield in as many points in the interior as possible, Green's functions between arbitrary points in the interior can be computed using only crosscorrelation and numerical integration.

As described in the above cited art, Green's function between two points can be calculated using the relationship:

$$G^q(x^B|x^A, t) + G^q(x^B|x^A, -t) = \qquad [3]$$
$$\int_{x \in \partial D} \left[ \begin{array}{l} G^q(x^A|x, t) * G_k^f(x^B|x, -t) + \\ G_k^f(x^A|x, t) * G^q(x^B|x, -t) \end{array} \right] v_k dA$$

Equation [3] shows how the homogenous pressure Green's function due to a point source of volume injection, $G^q(x^B|x^A, t)+G_k^f(x^B|x^A,-t)$ between points $x^B$ and $x^A$ can be computed by cross-correlation and summation of the pressure Green's function and $G^q(x^A|x, t)$ and $G_k^f(x^A|x,-t)$ in points $x^B$ and $x^A$ due to volume injection and unidirectional body force sources on the surface surrounding the medium. In addition, it may be necessary to include the pressure response due to unidirectional point force source using:

$$G_1^f(x^B|x^A, t) + G_1^f(x^B|x^A, -t) = \qquad [4]$$
$$\int_{x \in \partial D} \left[ \begin{array}{l} \Gamma_1^q(x^A|x, t) * G_k^f(x^B|x, -t) + \\ \Gamma_{1,k}^f(x^A|x, t) * G^q(x^B|x, -t) \end{array} \right] v_k dA$$

Thus to model the pressure in point $x^B$ due to a unidirectional point force source in the 1-direction at point, it is necessary to use the particle velocity Green's functions in point $x^A$ due to both, monopole and dipole sources on the surrounding surface, and the pressure Green's function in point $x^B$ due to both, monopole and dipole sources on the surrounding surface.

As noted above, the Green's functions as established by the interferometric method can be used to update the wavefield at an arbitrary boundary outside the extrapolation surface to contain both ingoing and outgoing waves including all multiple scattering between the two domains inside $D_{sct}$ and the background model. Hence any wavefield injected from said boundary into the scatterer domain is an exact representation of the full wavefield. The boundary on which the wavefield is update for injection in the changed scattering domain is referred to as injection boundary. It encloses the scatter surface $D_{sct}$ but is chosen such that it is significantly smaller than the complete model domain.

The above Green's functions can also be used to extrapolate the exact wavefield from the extrapolation surface to any other location within and on the boundary of the computational domain. Hence, the Green's functions can be used to extrapolate the wavefield to receiver locations. At the receiver location the modeled values of the wavefield can be considered to evaluate the effect the changes in the scatter domain had on the propagations and distribution of wavefield energy in the body or medium. The values can also be used to compare the modeled values of the wavefield with measured values. Used iteratively the steps of comparing the measured values and modeled values of the wavefield and altering the scatters in response to a mismatch between the two datasets can be applied as forward modeling tool.

Steps in accordance with an example of the invention are shown in the flow chart of FIG. 1.

The steps 11 and 12 include illuminating entire model from the outside using a full waveform modeling method and store waveforms in gridpoints/nodes as required by subsequent computations.

The step 13 includes perturbing the model in one or more regions.

The step 14 includes the definition of extrapolation surfaces that completely surround the perturbations and injection boundary in the immediate vicinity of the extrapolation surfaces.

The step 15 includes computing Green's functions between a desired source location and the injection surfaces using interferometry and data from step 21. These form the incident wavefields. Green's functions are also computed between points on the extrapolation surfaces and points on the injection surfaces using interferometry and data from step 1.

In step 16 a buffer is created for each injection surface containing current and future injection values and initialized with the incident wavefield.

In step 17 a subroutine is started to run parallel full waveform modeling on domains interior to the injection surfaces.

At every timestep the routine:

(a) Updates all gridpoints/nodes on the computational domains conventionally, except gridpoints/nodes on the injection surfaces that truncate the domains.

(b) Extrapolates current wavefield from the extrapolation surfaces to future times on the injection surfaces using Green's functions computed in step 6. Update the buffers containing current and future injection values by adding.

(c) Stores the current wavefield at the extrapolation surfaces.

(d) Repeats the above steps until a last timestep is computed.

In step 18 Green's functions are computed between points on the extrapolation surfaces and arbitrary receiver locations using interferometry and data above and the wavefield stored in step (c) is extrapolated to receiver locations using the computed Green's functions.

The above steps can be repeated until no more perturbations are desired.

Figure 2:
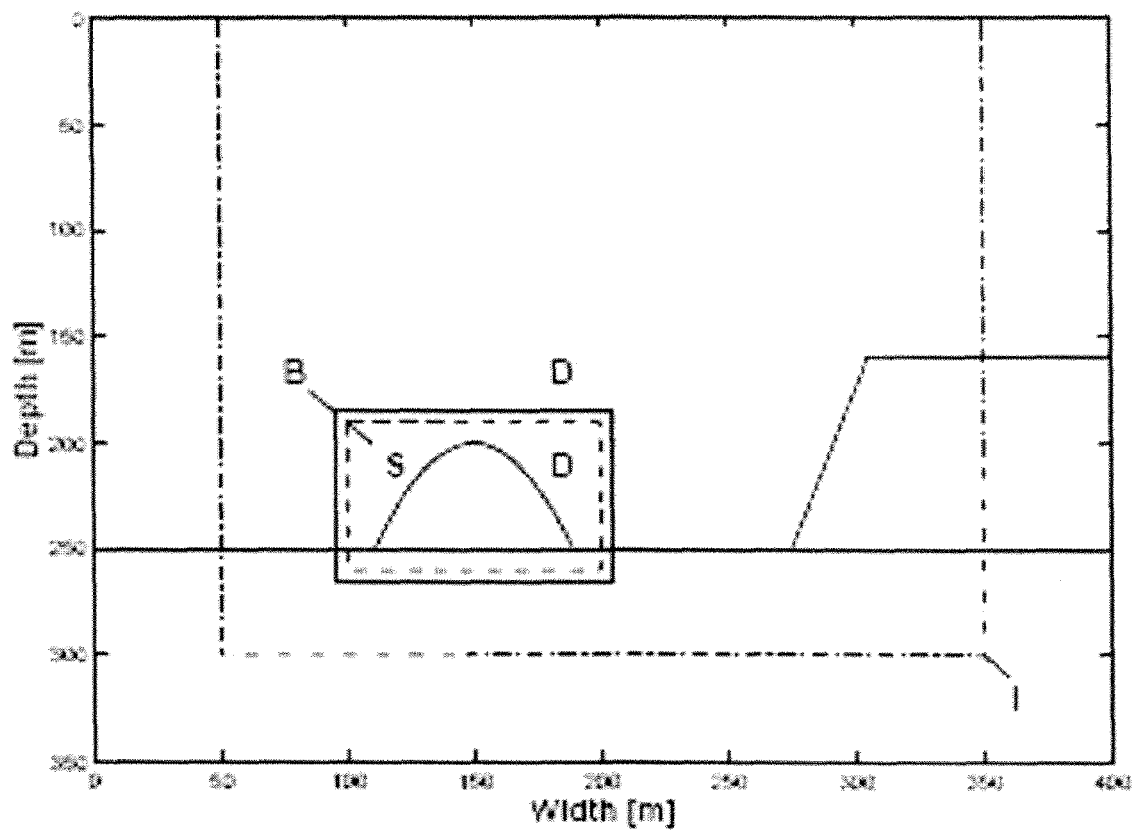
FIG. 2 shows a simplified model for an application of a finite-difference calculation as used in accordance with the invention.

The novel method is tested using an acoustic 2D staggered finite-difference scheme (2nd order in space and time) [and the so-called French model. This model is often used by the exploration seismic community to benchmark their compu-tations and consists of a dome D and a single fault block F as shown in FIG. 2. The gridspacing and timestep used are 1 m and 2.5e-4 s, respectively.

First, the model is systematically illuminated from the outside by putting 900 point sources on the surrounding surface I (one between every gridpoint), while recording the wavefield (both pressure and particle velocity) in every fifth gridpoint. Absorbing (radiation) boundary conditions are used just outside I to truncate the computational domain. To ensure that the interferometric Green's functions required for extrapolation have a flat spectrum in the source band, impulsive delta-functions are applied. This is important for the subsequent test as Kirchhoff extrapolated waves are directly compared with FD extrapolated waves on a new boundary B.

Next, the model is perturbed by increasing the sound speed by 200 m/s inside the dome and an extrapolation surface S is defined that completely surrounds the perturbations.

The new boundary condition, B, is set 5 m outside the extrapolation surface to avoid the influence of the diffraction limit inherent to the interferometric Green's functions. Without loss of generality, a pressure (Dirichlet) boundary condition is adopted and collocated the points on B with the FD staggered pressure gridpoints.

Using interferometry, the incident pressure wavefield due to a point source of volume injection at coordinates [75,25] is computed for all points on the boundary B. This wavefield is used to initialize a buffer containing current and future values of the pressure boundary condition. It should be noted that the inferometric method allows for the computation of an incident wavefield for arbitrary shot, receiver and perturbation locations. The Green's functions are bandlimited for display purposes only.

After every timestep of the FD computation on the sub domain D, these Green's functions are scaled by the particle velocity in point $x_j$ and added to the buffer containing current and future values of the BC using equation [2]. It should be noted that all gridpoints on the FD subdomain are updated conventionally, except gridpoints collocated with the Boundary condition. Also, since the pressure and particle velocity are staggered in space and time, they are interpolated to outputs at the same point and time on the extrapolation surface S.

The invention claimed is:

1. An apparatus for evaluating an interaction between a wavefield and a body, comprising:

(a) means for providing an injection boundary enclosing a subspace of a model having one or more physical and/or geometrical properties representing a body;

(b) means for providing an extrapolation surface enclosing a portion of the subspace;

(c) means for generating at and/or near the injection boundary waveforms representing an initial interaction between an initial wavefield and the body;

(d) means for changing the physical and/or geometrical properties in the portion of the subspace enclosed by the extrapolation surface;

(e) means for applying the waveforms to the subspace as a boundary condition, thereby radiating/emitting the waveforms into the subspace;

(f) means for propagating the radiated/emitted waveforms throughout the subspace;

(g) means for using Green's functions to extrapolate the propagated waveforms recorded/observed along the extrapolation surface to the injection boundary, thereby implementing one or more interactions between the waveforms propagated throughout the subspace and the model; and (h) means for updating the boundary condition.

2. The apparatus of claim 1, wherein the body is a solid body.

3. The apparatus of claim 1, wherein the body supports acoustic wave propagation.

4. The apparatus of claim 1, wherein the body supports elastic wave propagation.

5. The apparatus of claim 1, wherein the body supports electromagnetic wave propagation.

6. The apparatus of claim 1, wherein the means for changing the physical and/or geometrical properties comprises means for changing the density or compressibility or both.

7. The apparatus of claim 1, wherein the means for changing the physical and/or geometrical properties comprises means for changing the oil/water contact.

8. The apparatus of claim 1, wherein the means for updating the boundary condition comprises means for adding the extrapolated waveforms to the waveforms.

9. The apparatus of claim 1, wherein the means for (e)-(h) are to determine one or more effects of changes of the physical and/or geometrical properties in the portion of the subspace on the initial wavefield.

10. The apparatus of claim 1, wherein the means for propagating the radiated/emitted waveforms throughout the subspace comprises means for advancing a finite-difference computation on the subspace by a single time-step.

11. The apparatus of claim 1, wherein the means for updating the boundary condition comprises means for absorbing waveforms that are propagating outward at the edge of the subspace and means for radiating waveforms that are propagating inward at the edge of the subspace, upon application of the waveforms to the subspace when step (e) is repeated.

12. The apparatus of claim 1, wherein the Green's functions used to extrapolate the propagated waveforms to the injection boundary are Green's functions for an inhomogeneous medium.

13. The apparatus of claim 1, wherein the Green's functions used to extrapolate the propagated waveforms to the injection boundary are Green's functions calculated for the full model having inhomogeneities.

14. The apparatus of claim 1, wherein the boundary condition is updated to include waveforms emitted from a location on the extrapolation surface at past and future times.

15. The apparatus of claim 1, wherein the injection boundary has a greater distance from the boundary of the model than from the extrapolation surface.

16. The apparatus of claim 1, further comprising means for computing Green's functions between the location of a simulated source and points at and/or near the injection boundary.

17. The apparatus of claim 1, further comprising means for computing Green's functions between points on the extrapolation surface and the location of a simulated receiver.

18. The apparatus of claim 1, wherein the apparatus is used iteratively to adapt a response of the model to a measured response.

19. The apparatus of claim 1, wherein the apparatus is used iteratively to adapt a response of an Earth model to a measured response of a seismic wavefield.

20. The apparatus of claim 1, wherein the extrapolated waveforms is an exact representation of the wavefield.

* * * * *